UNITED STATES PATENT OFFICE.

CHARLES DE LA HARPE AND CHARLES VAUCHER, OF BASLE, SWITZERLAND, ASSIGNORS TO L. DURAND, HUGUENIN & CIE., OF SAME PLACE.

OXAZIN DYE.

SPECIFICATION forming part of Letters Patent No. 638,576, dated December 5, 1899.

Application filed July 12, 1898. Serial No. 685,743. (Specimens.)

*To all whom it may concern:*

Be it known that we, CHARLES DE LA HARPE and CHARLES VAUCHER, chemists, citizens of the Swiss Republic, and residents of Basle, Switzerland, have invented certain Improvements in the Manufacture of Oxazin Dyes, of which the following is a clear and complete specification.

We have found that the oxazin dye resulting from the action of hydrochlorate of nitrosodimethylanilin or of hydrochlorate of dimethylamidoazobenzene upon gallamic acid gives, when heated under pressure and with exclusion of air in a closed vessel with sulfurous acid in a free state or in the form of a sulfite or bisulfite, a new coloring-matter, which is not only chemically different from the original oxazin dye, but also from the bisulfite compound which is described in the United States Patent of Rodolphe Geigy, No. 410,733, dated September 10, 1889. Thus when our coloring-matter and the bisulfite compound of the said Patent No. 410,733 are separately dissolved in sulfuric acid there is obtained in both cases a dichroic violet-tinted liquor relatively slightly colored. If a small quantity of an oxidizing agent is added to these solutions, the color turns to dark blue; but if at this moment water be added the liquor resulting from the bisulfite compound of the Patent No. 410,733 becomes a fuchsin red, while ours becomes violet. Furthermore, the aqueous solution of the bisulfite compound of the Patent No. 410,733 can hardly be precipitated, even scantily, by hydrochloric acid, while the aqueous solution of our product yields an abundant precipitate. The aqueous alkaline solutions of our product, as well as of that of the bisulfite compound of the said patent, are rapidly oxidized in contact with the air or by the addition of an oxidizing agent. If after such oxidation a surplus of acid be added thereto, the product of the said Patent No. 410,733 disengages a large quantity of sulfurous acid, while our product does not disengage sulfurous acid by such addition of acid. These two experiments must be made on the solid product separated by filtration from the pastes representing the commercial products, the waters being able to contain in solution sulfurous acid in a free state or in the form of sulfite or bisulfite. Finally, the bisulfite compound of the said Patent No. 410,733 gives by application in dyeing and in printing a violet tint, while our product furnishes a much bluer tint.

Following are examples of the mode of preparing our product.

Example 1: Fifty kilos of the oxazin dye resulting from the action of hydrochlorate of nitrosodimethylanilin upon gallamic acid, fifty kilos of neutral sodium sulfite, and four hundred liters of water are introduced successively into an enameled autoclave or any other suitable vessel, which may be closed by a cover and must be able to resist the chemical agents employed and also be capable of resisting some pressure. After the mixture has been heated for at least five hours at a temperature of 90° to 100° centigrade the transformation is effected and the mass assumes a greenish-gray color.

Example 2: Fifty kilos of the oxazin dye resulting from the action of hydrochlorate of nitrosodimethylanilin upon gallamic acid, forty-five kilos of sodium bisulfite of 38° to 40° Baumé, and four hundred and five liters of water are introduced successively into a vessel like that specified in the foregoing example, and the mixture is heated for some hours at 90° to 100° centigrade until the mass shows a greenish-gray coloration.

Example 3: Fifty kilos of the oxazin dye resulting from the action of hydrochlorate of nitrosodimethylanilin upon gallamic acid, four hundred liters of water, forty-five kilos of a solution of sodium bisulfite of 38° to 40° Baumé, and twenty kilos of commercial hydrochloric acid or ten kilos of sulfuric acid are introduced successively into a vessel like that specified in the first example, and the mixture is heated while being stirred at, for instance, about 100° centigrade until the transformation is effected—that is to say, until a sample taken from the reaction mass yields, on the addition of sodium carbonate, a greenish precipitate. The mass itself has a brownish color.

In the two first cited examples it will be possible after the reaction has terminated to add a sufficient quantity of hydrochloric or sulfuric acid in order to liberate the sulfurous acid combined with the sodium, and then to boil up to complete distillation of the sulfurous acid.

In example 3 the sulfurous acid may be expelled by ebullition without the addition of more mineral acid.

The oxazin employed in the three foregoing examples may be in form of a salt (hydrochlorate, &c.) or in form of the base.

The product of reaction obtained according to the one or the other of the three described examples forms a paste which can be employed either directly or after the addition of an acid for dyeing and printing purposes. By dissolving this product in concentrated sulfuric acid a violet-tinted dichroic solution is obtained, and on the addition thereto of a very small quantity of an oxidizing agent, as nitric acid, sodium nitrite, manganese dioxid, &c., it assumes an intense blue color, which turns to violet when water is added.

The different aspects of the products obtained according to the three described examples originate from their different steps or degrees of chemical acidity. Indeed an addition of small quantities of sodium carbonate or of another alkali to the brownish product obtained according to example 3 yields immediately a precipitate which is a greenish powder. This is identical with the product obtained according to example 1 and is soluble in an excess of the reactive agent and has a brownish-yellow color. By its contact with the air this latter solution turns rapidly to a dark violet. The products obtained according to the three examples can be precipitated from their solution by means of common salt, and according to the degree of acidity this precipitation is retarded or facilitated. Thus this precipitation may be obtained more easily from the slightly-colored aqueous solutions of the product of examples 1 and 2 than from the red acid solution of the product obtained according to example 3.

In dyeing and calico-printing the new coloring-matter may be fixed upon metallic mordants, and especially upon those of chromium, and it gives blue shades.

What we claim is—

As a new article of manufacture, the herein-described coloring-matter derived from the oxazin dye resulting from the action of hydrochlorate of nitrosodimethylanilin upon gallamic acid, the said coloring-matter giving in dyeing and printing bluer tints than the original oxazin dye from which it is derived, furnishing with concentrated sulfuric acid a violetish dichroic solution, which assumes by addition of an oxidizing agent a blue coloration which turns to violet on addition of water, giving an abundant precipitate on addition of water to its aqueous solutions and disengages no sulfurous acid where a surplus of acid is added to its oxidized alkaline solutions.

In witness whereof we have hereunto signed our names, this 30th day of June, 1898, in the presence of two subscribing witnesses.

CHARLES DE LA HARPE.
CHARLES VAUCHER.

Witnesses:
GEORGE GIFFORD,
AMAND RITTER.